(12) United States Patent
Koudal et al.

(10) Patent No.: US 6,938,496 B2
(45) Date of Patent: Sep. 6, 2005

(54) VORTEX FLOW PICKUP

(75) Inventors: Ole Koudal, Baden (CH); Rainer Höcker, Waldshut (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/233,673

(22) Filed: Sep. 4, 2002

(65) Prior Publication Data

US 2003/0061887 A1 Apr. 3, 2003

Related U.S. Application Data

(60) Provisional application No. 60/330,929, filed on Nov. 2, 2001.

(30) Foreign Application Priority Data

Sep. 4, 2001 (EP) ............................. 01121150

(51) Int. Cl.⁷ ................................................ G01F 1/32
(52) U.S. Cl. .................................................. 73/861.22
(58) Field of Search ........................ 73/861.22, 861.23, 73/861.24, 194

(56) References Cited

U.S. PATENT DOCUMENTS

| | | | | |
|---|---|---|---|---|
| 3,572,117 A | * | 3/1971 | Rodely ...................... | 73/861.22 |
| 3,587,312 A | | 6/1971 | McMurtrie et al. | |
| 3,732,731 A | * | 5/1973 | Fussell, Jr. ................ | 73/861.22 |
| 4,048,854 A | * | 9/1977 | Herzl ........................ | 73/861.02 |
| 4,404,858 A | * | 9/1983 | Blechinger ............... | 73/861.22 |
| 5,463,904 A | | 11/1995 | Kalinoski | |
| 6,003,383 A | | 12/1999 | Zielinska et al. | |
| 6,003,384 A | * | 12/1999 | Frohlich et al. .......... | 73/861.22 |
| 6,170,338 B1 | * | 1/2001 | Kleven et al. ............ | 73/861.22 |
| 6,237,425 B1 | * | 5/2001 | Watanobe .................. | 73/861.22 |
| 6,276,218 B1 | | 8/2001 | Waers | |
| 6,352,000 B1 | | 3/2002 | Getman et al. | |

FOREIGN PATENT DOCUMENTS

| | | |
|---|---|---|
| EP | 0 666 467 B1 | 8/1995 |
| GB | 2 084 324 A | 4/1982 |
| WO | WO 03/021201 A1 | 3/2003 |

* cited by examiner

*Primary Examiner*—Harshad Patel
(74) *Attorney, Agent, or Firm*—Bacon & Thomas

(57) ABSTRACT

A vortex flow pickup serves for measuring mass flow, volume flow or flow velocity of a fluid which is flowing in a measuring tube having a tube wall, and has a temperature sensor arranged in such a way that the vortex flow pickup may also be used together with those fluids which corrode the temperature sensor. A bluff body which produces vortices, and consequently pressure fluctuations, is arranged in the measuring tube. A vortex sensor responding to these pressure fluctuations is fitted downstream of the bluff body in a bore of the tube wall of the measuring tube. The vortex sensor comprises a diaphragm which covers the bore and on which a sensor vane protruding into the fluid is fastened. The temperature sensor is fixed on the bottom of a blind hole of the sensor vane. On the side of the diaphragm lying opposite the sensor vane, a sensor element is fastened. The temperature sensor may alternatively be arranged in a longitudinal bore of the bluff body.

32 Claims, 4 Drawing Sheets

VORTEX FLOW PICKUP

This application is based on Provisional Application, No. 60/330,909, filed Nov. 2, 2001.

FIELD OF THE INVENTION

The invention relates to a vortex flow pickup for measuring the volume flow, the mass flow of the flow velocity of the fluid flowing in a direction of flow in a measuring tube, with a bluff body which serves for producing Karman vortices being arranged over a diameter of the measuring tube.

BACKGROUND OF THE INVENTION

The volume flow is defined as the volume of fluid flowing through the cross section of the measuring tube per unit of time and the mass flow is defined as the mass of fluid flowing through the cross section of the measuring tube per unit of time.

It is known that, during the operation of a vortex flow pickup of this type, a Karman vortex street is produced downstream of the bluff body and its pressure fluctuations are converted by a vortex sensor into an electrical signal, the frequency of which is proportional to the volume flow or the flow velocity.

In U.S. Pat. No. 6,003,384 there is a description of a currently customary vortex flow pickup for measuring the volume flow or the flow velocity of a fluid which is flowing in a direction of flow in a measuring tube having a tube wall, which vortex flow pickup comprises:

a bluff body which is arranged along a diameter of the measuring tube and
  serves for producing Karman vortices and
  is connected to the tube wall of the measuring tube from the inside at a first and a second fixing location, which lie opposite each other,
a vortex sensor, which responds to pressure fluctuations produced by the vortices, is fitted downstream of the bluff body in a bore of the tube wall of the measuring tube and seals off this bore,
the center of the bore lying together with the center of the first fixing location of the bluff body on a generatrix of the measuring tube and
the vortex sensor comprising:
  a diaphragm covering the bore, with a first surface facing the fluid and a second surface facing away from the fluid,
  a wedge-shaped sensor vane, which is fastened on the first surface of the diaphragm and
    is shorter than the diameter of the measuring tube and
    has principal surfaces in line with the generatrix of the measuring tube and also a front edge, and
  a sensor element fastened on the second surface.

If the temperature of the fluid is also measured by means of a temperature sensor, the mass flow can be determined, for example calculated by means of a microprocessor, from the volume flow, the type of fluid and its properties as well as the temperature at any given time.

This has already been described some time ago in the case of vortex flow pickups with different types of vortex sensors. For instance, U.S. Pat. Nos. 4,048,854 and 4,404,858 each show a temperature sensor which is arranged on the tube wall of the measuring tube from the inside in such a way that it is skimmed over by the flowing fluid.

In JP-A 2000-2567 there is a description of a vortex flow pickup for measuring the mass flow, the volume flow or the flow velocity of a fluid which is flowing in a direction of flow in a measuring tube having a tube wall, which vortex flow pickup comprises a blade which is fixed on one side to the tube wall from the inside by means of a base plate and
  during operation produces Karman vortices,
  is shorter than a diameter of the measuring tube and
  has parallel principal surfaces aligned perpendicularly to the direction of flow and a rounded front face,
  on which a temperature sensor is arranged,
first sensor elements, fastened in the vicinity of the fixing location, for pressure fluctuations of the flowing fluid produced by the Karman vortices and
second sensor elements, fastened in the vicinity of the fixing location, for deflections of the blade produced by the flowing fluid.

This temperature sensor is also skimmed over by the flowing fluid and, as the inventors have found, is consequently not resistant to all fluids encountered in operation, i.e. some fluids corrode temperature sensors arranged in such a way.

These fluids which corrode the temperature sensor must therefore be banned from use with the vortex flow pickup by the manufacturer of the latter. However, such a ban restricts the use of these vortex flow pickups, that is the universality of their applications, and consequently also their attractiveness on the market.

One object on which the invention is based is to specify vortex flow pickups with a bluff body and with a vortex sensor fixed in the tube wall of the measuring tube and with a temperature sensor which is arranged in such a way that the respective vortex flow pickup may also be used together with those fluids which corrode the temperature sensor.

SUMMARY OF THE INVENTION

To achieve this object, the first variant of the invention comprises a vortex flow pickup for measuring the mass flow, the volume flow or the flow velocity of a fluid which is flowing in a direction of flow in a measuring tube having a tube wall, which vortex flow pickup comprises:

a bluff body which is arranged along a diameter of the measuring tube and
  serves for producing Karman vortices and
  is connected to the tube wall of the measuring tube from the inside at a first and a second fixing location, which lie opposite each other,
a vortex sensor, which responds to pressure fluctuations produced by the vortices, is fitted downstream of the bluff body in a bore of the tube wall of the measuring tube and seals off this bore,
the center of the bore lying together with the center of the first fixing location of the bluff body on a generatrix of the measuring tube and
the vortex sensor comprising:
  a diaphragm covering the bore, with a first surface facing the fluid and a second surface facing away from the fluid,
  a sensor vane, which is fastened on the first surface of the diaphragm and
    is shorter than the diameter of the measuring tube,
    has principal surfaces in line with the generatrix of the measuring tube and also at least one front edge, and
    is provided with a blind hole, a bottom of which lies in the vicinity of the at least one front edge,
  a temperature sensor, which is fixed on the bottom of the blind hole, and a sensor element fastened on the second surface.

To achieve the stated object, a second variant of the invention comprises a vortex flow pickup for measuring the mass flow, the volume flow or the flow velocity of a fluid which is flowing in a direction of flow in a measuring tube having a tube wall, which vortex flow pickup comprises:
a bluff body which is arranged along a diameter of the measuring tube and
 serves for producing Karman vortices and
 is connected to the tube wall of the measuring tube from the inside at a first and a second fixing location, which lie opposite each other,
a vortex sensor, which responds to pressure fluctuations produced by the vortices, is fitted downstream of the bluff body in a first bore of the tube wall of the measuring tube and seals off this bore,
the center of the first bore lying together with the center of the first fixing location of the bluff body on a generatrix of the measuring tube,
the bluff body being provided with a blind hole,
 which is in line with a second bore in the tube wall and
 in which a temperature sensor is fitted, and
the vortex sensor comprising:
 a diaphragm covering the first bore, with a first surface facing the fluid and a second surface facing away from the fluid,
 a sensor vane, which is fastened on the first surface of the diaphragm and
  is shorter than the diameter of the measuring tube and
  has principal surfaces in line with the generatrix of the measuring tube and also at least one front edge, and
 a sensor element fastened on the second surface.

According to a preferred embodiment of both variants of the invention, the principal surfaces of the sensor vane form a wedge with a single front edge.

One advantage of the invention is that the temperature sensor has no chance of coming into contact with the flowing fluid and consequently also cannot be corroded by it. Nevertheless, the temperature sensor is arranged so close to the fluid that it senses its temperature with virtually no delay; it is in fact separated from the fluid only by the thin wall of the vortex sensor or of the bluff body and, like the remaining parts of the vortex flow pickup, these parts are produced from a metal, preferably stainless steel, and are therefore good heat conductors.

A further advantage of the invention is that, in a way corresponding to the book by F. P. Incropera and D. P, DeWitt "Fundamentals of Heat and Mass Transfer", 4th edition, 1996, ISBN 0-471-30460-3, pages 114 to 119 and 407, the temperature sensor arranged in the sensor vane or in the bluff body can work together with a second temperature sensor, which is fastened on the measuring tube, preferably from the outside, that is to say likewise does not come into contact with the fluid. As known, if the second temperature sensor is provided, a more exact temperature measurement is obtained than with a single temperature sensor.

The invention and further advantages are now explained in more detail on the basis of exemplary embodiments, which are represented in the figures of the drawing. The same parts are designated in the different figures by the same reference numerals, which are omitted however if necessary for the sake of clarity.

DETAILED DESCRIPTION OF THE PREFERRED EMBODIMENTS

Figure 1:
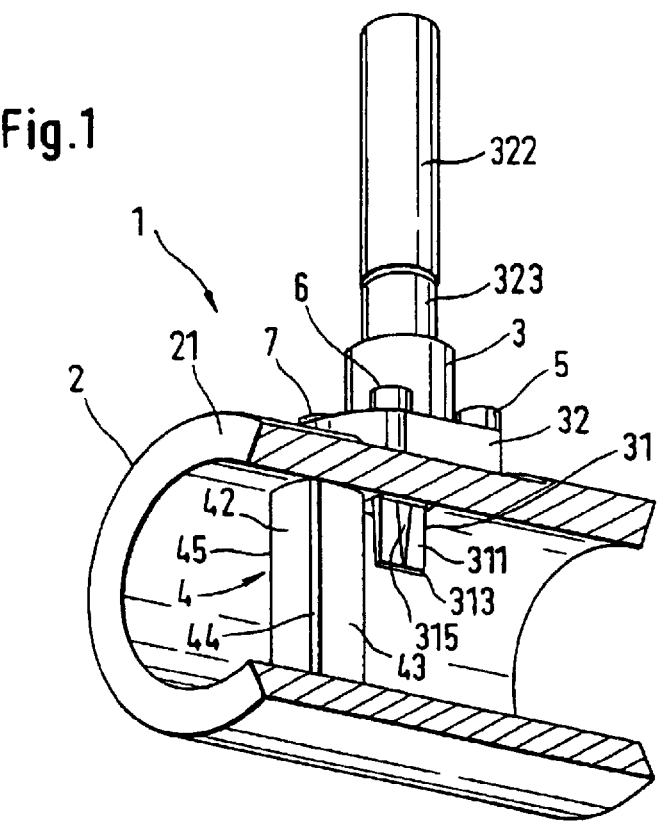
FIG. 1 shows a vortex flow pickup corresponding to the first variant of the invention in a perspective view, as seen in the direction of flow, and partly cut open.

FIGS. 1 to 4 are described together below, since the details cannot all be represented in each figure. The perspective views shown first in FIGS. 1 and 2, and serving as an overview, of an exemplary embodiment of the first variant show a partly cut open vortex flow pickup 1, seen on the one hand in the direction of flow (FIG. 1) and on the other hand seen counter to the direction of flow (FIG. 2), with a vortex sensor 3 fixed to a tube wail 21 of a measuring tube 2 and protruding through a bore 22. This si preferably a dynamically compensated vortex sensor with a capacitive sensor element, as is described in U.S. Pat. No. 6,003,384, the content of which belongs to the disclosure of this application.

Arranged along a diameter of the measuring tube 2, in the interior of the latter, is a bluff body 4, which is firmly connected to the measuring tube 2, thereby forming a first fixing location 41, which is represented, and a second fixing location 41*, which is concealed. The center of the bore 22 and the center of the fixing location 41 lie on a generatrix of the measuring tube 2.

The bluff body 4 has an impact surface 42, against which, in operation, a fluid to be measured, for example a liquid, a gas or a vapor, flows. The bluff body 4 also has two lateral surfaces, of which only one (front) lateral surface 43 can be seen in FIGS. 1 and 2. Two separation edges are formed by the impact surface 42 and the lateral surfaces, only one (front) separation edge 44 of these being completely visible and one (rear) separation edge 45 being shown in an indicative manner in FIG. 1.

Figure 2:
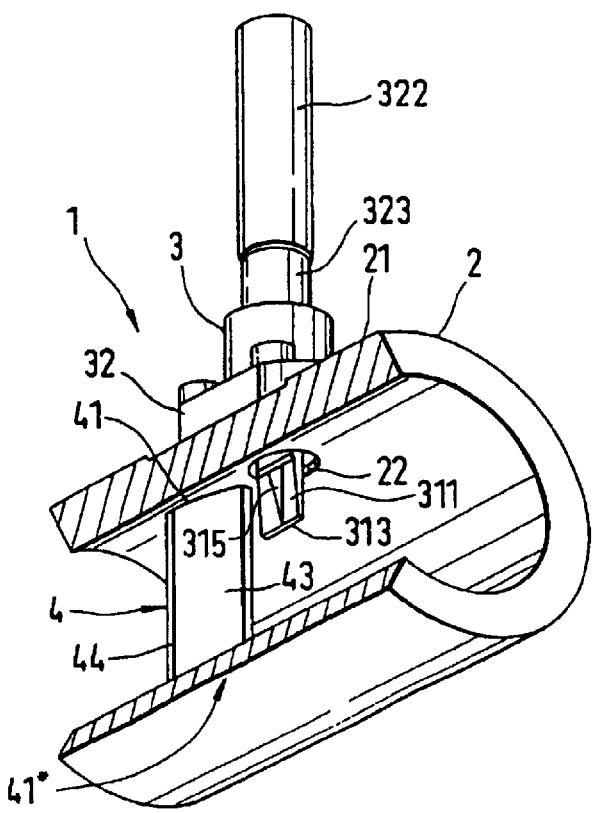
FIG. 2 shows the vortex flow pickup from FIG. 1 in a perspective view, as seen counter to the direction of flow, and partly cut open.

The bluff body 4 of FIGS. 1 and 2 has substantially the shape of a straight triangular column, that is a column with a triangular cross section. However, other conventional shapes of the bluff body can also be used in the invention.

The flow of the fluid against the impact surface 42 leads to the formation, downstream of the bluff body 4, of a Karman vortex street in the fluid due to the fact that vortices separate alternately at each separation edge and are carried along by the flowing fluid. These vortices generate local pressure fluctuations in the fluid, the time-related separation frequency of which, i.e. what is referred to as their vortex frequency, is a measure of the flow velocity and/or the volume flow of the fluid.

The pressure fluctuations are converted by means of the vortex sensor 3 into an electrical signal, which is fed to evaluation electronics, which calculate the flow velocity and/or the volume flow of the fluid in the customary way.

Figure 3:
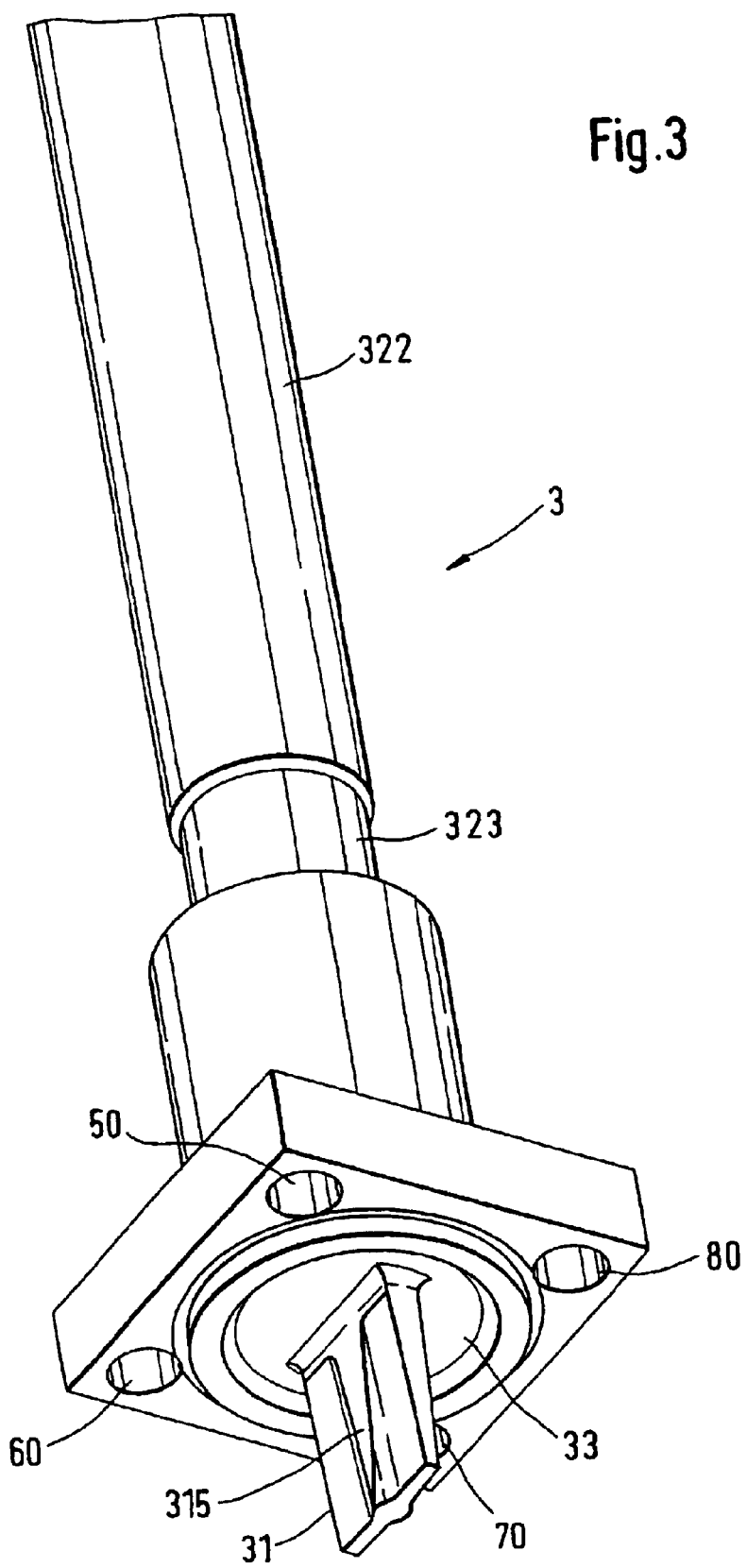
FIG. 3 shows the vortex sensor from FIGS. 1 and 2 in a perspective view from below.

The vortex sensor 3 is fitted downstream of the bluff body 4 in the bore 22 of the tube wall 21 of the measuring tube 2 and seals off the bore 22 from the circumferential surface of the measuring tube 2, the vortex sensor 3 being screwed to the tube wall 21. Used for example for this purpose are four screws, of which the screws 5, 6, 7 can be seen in FIGS. 1 and 2, while associated bores 50, 60, 70, 80 are represented in FIG. 3.

Of the vortex sensor 3, a wedge-shaped sensor vane 31, protruding into the interior of the measuring tube 2 through the bore 22 of the tube wall 21, and a housing cap 32 can be seen in FIGS. 1 and 2. The housing cap 32 runs into an extension 322, by insertion of a thinner-walled intermediate piece 323, cf. the cited U.S. Pat. No. 6,003,384.

The sensor vane 31 has principal surfaces, of which only the principal surface 311 can be seen in FIGS. 1 and 2. The principal surfaces are in line with the mentioned generatrix of the measuring tube 2 and form a front edge 313. The sensor vane 31 may also have other suitable three-dimensional shapes; for example, it may have two parallel principal surfaces, which form two parallel front edges.

Figure 4:
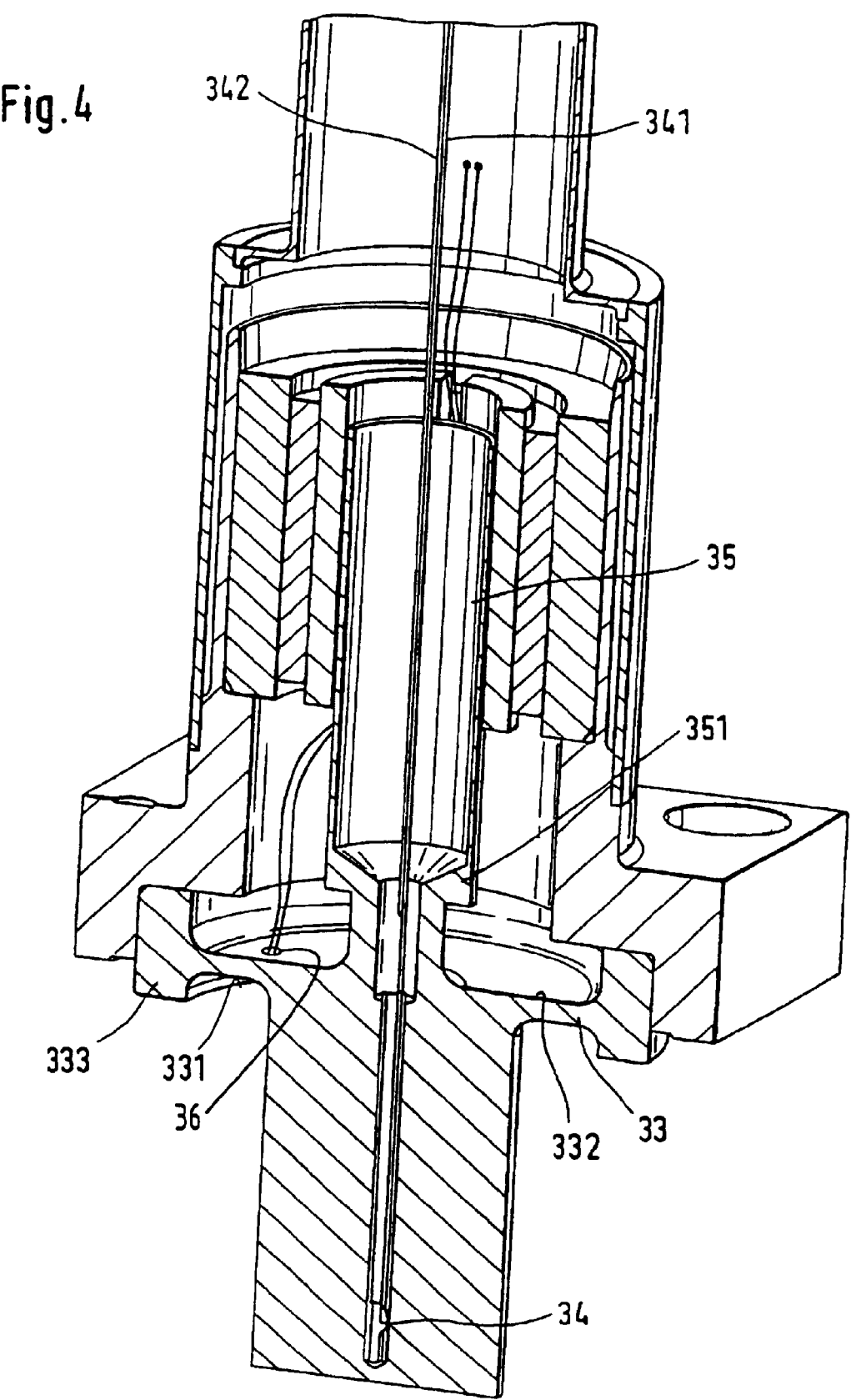
FIG. 4 shows a perspective longitudinal section of the vortex sensor of FIG. 3.

The sensor vane 31 is shorter than the diameter of the measuring tube 2; furthermore, it is flexurally rigid and has a blind hole 314 (can only be seen in FIG. 4). In order that the blind hole 314 has an adequate diameter, wall parts protrude from the principal surfaces, of which the wall part 315 is indicated in FIG. 2. The blind hole 314 reaches into the vicinity of the front edge 313, where it has a bottom.

Also belonging to the vortex sensor 3 is a diaphragm 33, which covers the bore 22 and has a first surface 331, facing the fluid, and a second surface 332, facing away from the fluid, see FIGS. 3 and 4. Fixed on the surface 331 is the sensor vane 31 and fixed on the surface 332 is a sensor element 35. Preferred are the sensor vane 31, the diaphragm 33, the annular rim 333 of which and the part 351 of the sensor element 35 that is fastened to the diaphragm 33 consisting of a single piece of material, for example metal, in particular stainless steel. The sensor element 35 generates the abovementioned signal, the frequency of which is proportional to the volume flow of the flowing fluid.

Fixed in the vicinity of the bottom of the blind hole 314 is a temperature sensor 34. Supply leads 341, 342 of the temperature sensor 34 lead centrally upward through the vortex sensor 3.

One of the supply leads 341, 342 may be omitted if the temperature sensor 34 is in electrical contact on one side with the sensor vane 31, and is consequently at the potential of circuit zero point. The temperature sensor 34 is preferably a platinum resistor.

Since the sensor vane 31, and in particular its wall part 315, can be made adequately thin and also preferably consist of metal, the temperature sensor 34 is virtually at the temperature at any given instant of the fluid flowing past the sensor vane 31 and, because of the low thermal capacity of the arrangement, is also very capable of following temperature changes of the fluid adequately quickly and virtually without any delay. Consequently, the mass flow can be calculated in the customary way from the temperature of the fluid, measured by the temperature sensor 34, and from the signal of the vortex sensor 3.

Figure 5:
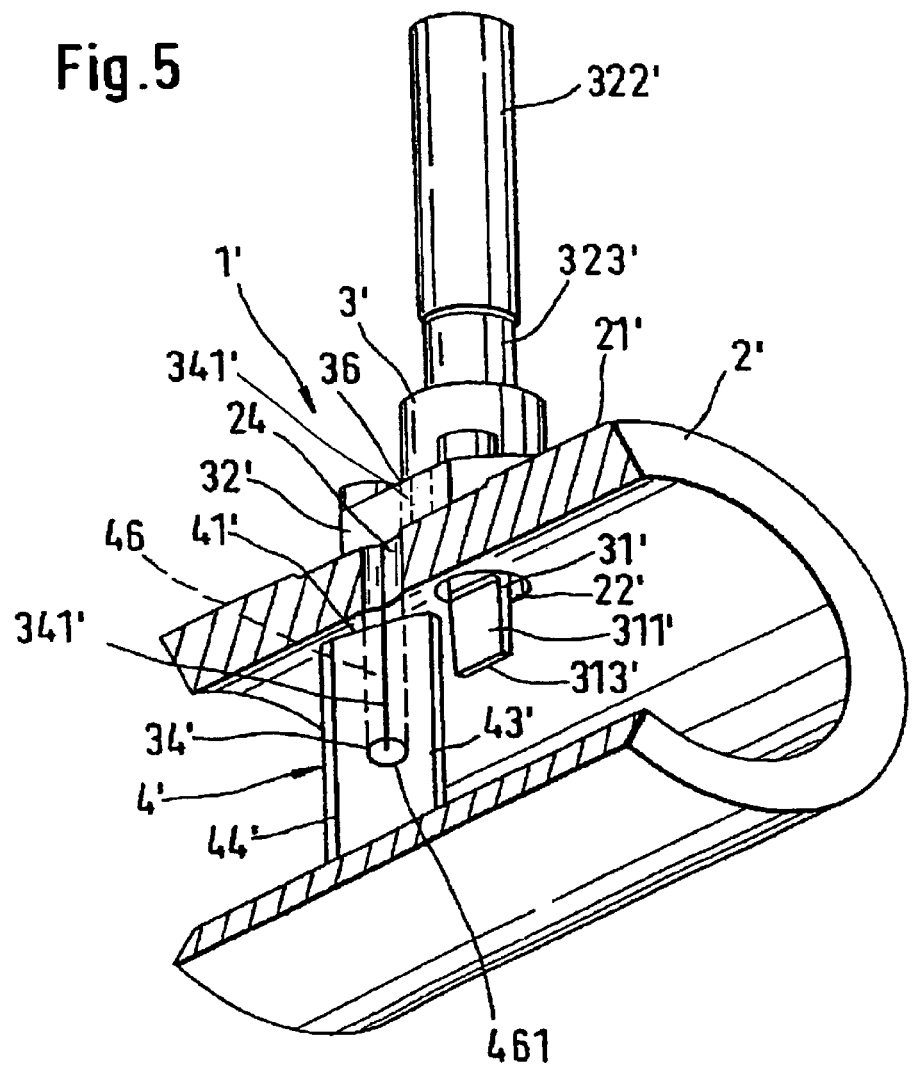
FIG. 5 shows in a way analogous to FIG. 2 a vortex flow pickup corresponding to the second variant of the invention in a perspective view and partly cut open.

In FIG. 5, a vortex flow pickup 1' corresponding to the second variant of the invention is represented in a way analogous to FIG. 2 in a perspective view and partly cut open. The parts of FIG. 5 which are of the same type as the parts of FIG. 2 are not explained again, but the reference numerals used for them in FIG. 2 are provided with an apostrophe.

The differences between the exemplary embodiment of the second variant of the invention and the exemplary embodiment of its first variant are, on the one hand, that the bluff body 4' is provided with a blind hole 46, which is in line with a second bore 24 in the tube wall 2' and in which a temperature sensor 34' is fitted, and, on the other hand, that the wedge-shaped sensor vane 31' has two planar principal surfaces 311'. The temperature sensor 34' has a supply lead 341'.

The blind hole 46 may be provided to any desired depth in the bluff body 4'; its bottom 461 preferably lies in such a way that the temperature sensor 34' is arranged in the center of the bluff body 4'.

Since the bluff body 4' can be made adequately thin in the region of the blind hole 46 and, like the sensor vane 31 of FIGS. 1 to 4, likewise preferably consists of metal, in particular stainless steel, the temperature sensor 34' is virtually at the temperature at any given instant of the fluid flowing past the bluff body 4' and, because of the low thermal capacity of the arrangement, also very able to follow temperature changes of the fluid adequately quickly and virtually without any delay. Consequently, the mass flow can again be calculated in the customary way from the temperature of the fluid, measured by the temperature sensor 34', and from the signal of the vortex sensor 3'.

In FIGS. 4 and 5, the opening 36 is shown through which the supply lead $341^1$ for the temperature sensor $34^1$ pass.

What is claimed is:

1. A vortex flow pickup for measuring at least one of: mass flow, volume flow and flow velocity of a fluid which is flowing in a direction of flow in a measuring tube, having a tube wall with a bore therein, which vortex flow pickup, comprises:

a bluff body which is arranged along a diameter of the measuring tube and serves for producing Karman vortices, said bluff body being connected to the tube wall of the measuring tube from the inside at a first and a second fixing location, which lie opposite each other; and a vortex sensor, which responds to pressure fluctuations produced by the vortices, said vortex sensor being fitted downstream of said bluff body in the bore of the tube wall of the measuring tube and seals off the bore, the center of the bore lying together with the center of said first fixing location of said bluff body on a generatrix of the measuring tube, said vortex sensor comprising:

a diaphragm covering the bore, with a first surface facing the fluid and a second surface facing away from the fluid;

a sensor vane, which is fastened on the first surface of the diaphragm and is shorter than the diameter of the measuring tube, said sensor vane has principal surfaces in line with the generatrix of the measuring tube and also at least one front edge, and is provided with a blind hole, a bottom of which lies in the vicinity of said at least one front edge; a temperature sensor, which is fixed on the bottom of said blind hole; and a sensor element fastened on said second surface, wherein: said temperature sensor is disposed within said sensor vane such that said temperature sensor being separated from the fluid to be measured.

2. The vortex flow pickup as claimed in claim 1, in which said principal surfaces of said sensor vane form a wedge with a single front edge.

3. A vortex flow pickup for measuring at least one of: mass flow, volume flow and flow velocity of a fluid which is flowing in a direction of flow in a measuring tube, having a tube wall with a fluid and a first bore and a second bore therein, which vortex flow pickup comprises:

a bluff body which is arranged along a diameter of the measuring tube and serves for producing Karman vortices, said bluff body being provided with a blind hole and being connected to the tube wall of the measuring tube from the inside at a first and a second fixing location, which lie opposite each other; and a vortex sensor, which responds to pressure fluctuations produced by the vortices, said vortex sensor being fitted downstream of said bluff body in the first bore of the tube wall, of the measuring tube and seals off this bore, the center of the first bore lying together with the center of said first fixing location of said bluff body on a generatrix of the measuring tube, said blind hole being in line with the second bore in the tube wall and in which a temperature sensor is fitted, and said vortex sensor comprising:

a diaphragm covering the first bore, with a first surface facing the fluid and a second surface facing away from the fluid, a sensor vane, which is fastened on the first surface of the diaphragm and is shorter than the diameter of the measuring tube, and has principal surfaces in line with the generatrix of the measuring tube and also at least one front edge; and a sensor element fastened on the second surface, wherein: said temperature sensor is disposed within said sensor vane such that said temperature sensor is separated from the fluid to be measured.

4. The vortex flow pickup as claimed in claim 3, in which said principal surfaces of said sensor vane form a wedge with a single front edge.

5. An apparatus for measuring a temperature of a flowing fluid and at least one of: volume flow, mass flow and flow velocity of said fluid, said apparatus comprising:

a measuring tube for conducting said flowing fluid;

a bluff body being arranged within said measuring tube for producing Karman vortices within said flowing fluid;

a sensor vane fitted within said measuring tube downstream of said bluff body, said sensor vane being operable to respond to pressure fluctuations produced by said Karman vortices;

a sensor element coupled to said sensor vane and operable to generate a signal having a frequency which is proportional to a time-related separation frequency of said Karman vortices; and a temperature sensor capable of following temperature changes of the fluid flowing past said sensor vane, wherein:

said temperature sensor is disposed within said sensor vane such that said temperature sensor being separated from the fluid to be measured.

6. The apparatus as claimed in claim 5, wherein:

said sensor vane is provided with a blind hole, and wherein said temperature sensor is fixed within said blind hole of said sensor vane.

7. The apparatus as claimed in claim 6, wherein:

said vane has a principal surface and wherein a wall-part of said blind hole protrudes from said principal surface.

8. The apparatus as claimed in claim 6, wherein:

said sensor vane is wedge-shaped.

9. The apparatus as claimed in claim 5, further comprising:

a microprocessor.

10. The apparatus as claimed in claim 9, wherein:

said microprocessor is coupled to said temperature sensor.

11. The apparatus as claimed in claim 10, wherein:

said microprocessor calculates the volume flow of the fluid.

12. The apparatus as claimed in claim 10, wherein:

said microprocessor calculates the mass flow of the fluid.

13. The apparatus as claimed in claim 9, wherein:

said microprocessor is coupled to said sensor element.

14. The apparatus as claimed in claim 5, further comprising:

evaluation electronics for calculating at least one: volume flow, mass flow and flow velocity of the fluid.

15. The apparatus as claimed in claim 14, wherein:

the signal generated by said sensor element is fed to said evaluation electronics.

16. The apparatus as claimed in claim 14, wherein:

said evaluation electronics comprise a microprocessor.

17. The apparatus as claimed in claim 5, wherein: said sensor element is disposed within said sensor vane spaced apart from said temperature sensor.

18. The apparatus as claimed in claim 5, wherein: said temperature sensor comprises a platinum resistor.

19. The apparatus as claimed in claim 5, wherein: said sensor vane is made from metal.

20. The apparatus as claimed in claim 5, further comprising:

a further temperature sensor, wherein:

said further temperature sensor is disposed spaced apart from said temperature sensor being disposed within the sensor vane.

21. An apparatus for measuring a temperature of a flowing fluid and at least one of: volume flow, mass flow and flow velocity of said fluid, said apparatus comprising:

a measuring tube for conducting said fluid to be measured;

a bluff body being arranged within said measuring tube for producing Karman vortices within said flowing fluid;

a sensor vane fitted within said measuring tube downstream of said bluff body, said sensor vane being operable to respond to pressure fluctuations produced by said Karman vortices;

a sensor element coupled to said sensor vane and operable to generate a signal having a frequency proportional to a time-related separation frequency of said Karman vortices; and a first temperature sensor capable of following temperature changes of the fluid flowing past said sensor vane and a second temperature sensor, wherein:

said first temperature sensor is disposed within said bluff body such that said temperature sensor is separated from the fluid to be measured, and said second temperature sensor is disposed outside said measuring tube.

22. The apparatus as claimed in claim 21, wherein said bluff body is provided with a blind hole, and said first temperature sensor is fixed within said blind hole of said bluff body.

23. The apparatus as claimed in claim 21, further comprising:

a microprocessor.

24. The apparatus as claimed in claim 23, wherein:

said microprocessor is coupled to said first temperature sensor.

25. The apparatus as claimed in claim 24, wherein:

said microprocessor calculates the volume flow of the fluid.

26. The apparatus as claimed in claim 24, wherein:

said microprocessor calculates the mass flow of the fluid.

27. The apparatus as claimed in claim 23, wherein:
said microprocessor is coupled to said sensor element.

28. The apparatus as claimed in claim 21, further comprising:
evaluation electronics for calculating at least one: volume flow, mass flow and flow velocity of the fluid.

29. The apparatus as claimed in claim 28, wherein:
the signal generated by said sensor element is fed to said evaluation electronics.

30. The apparatus as claimed in claim 29, wherein:
said evaluation electronics comprise a microprocessor.

31. The apparatus as claimed in claim 21, wherein: said first temperature sensor comprises a platinum resistor.

32. The apparatus as claimed in claim 21, wherein: said bluff body is made from metal.

* * * * *